March 20, 1951     R. A. SFORZINI     2,545,495
ANNULAR COMBUSTION CHAMBER AIR FLOW ARRANGEMENT
ABOUT THE FUEL NOZZLE END
Filed Aug. 6, 1947
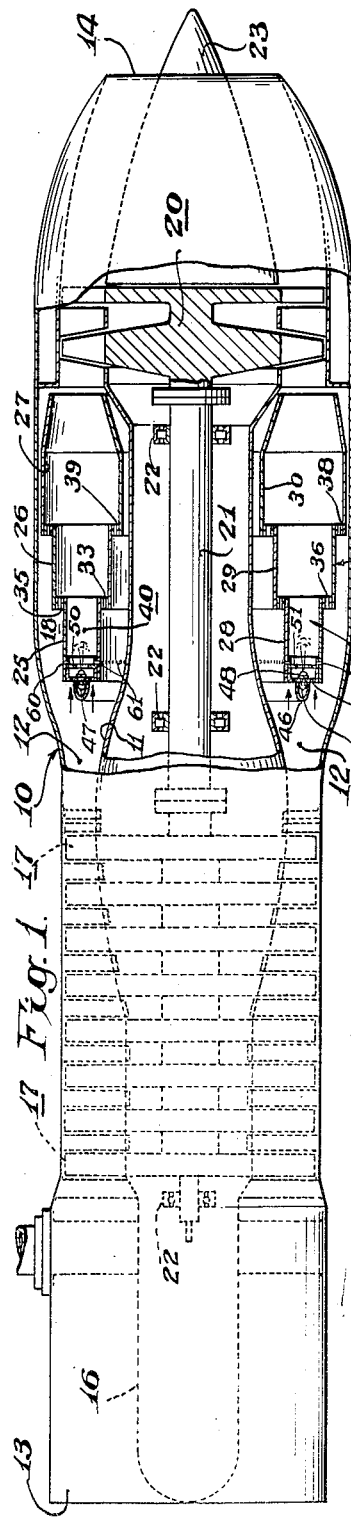
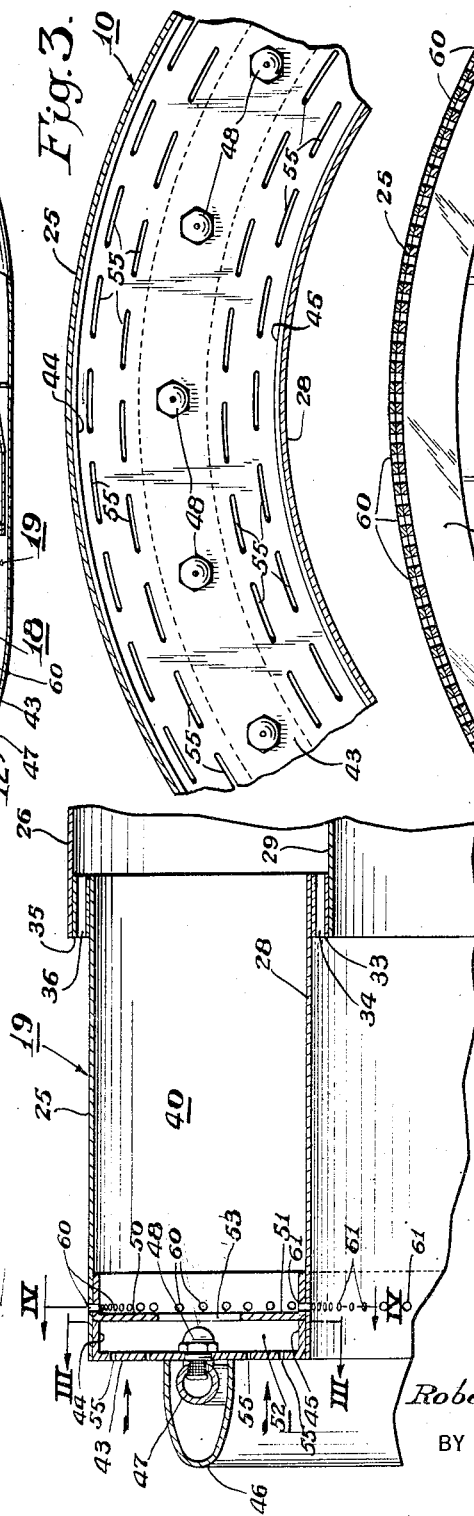
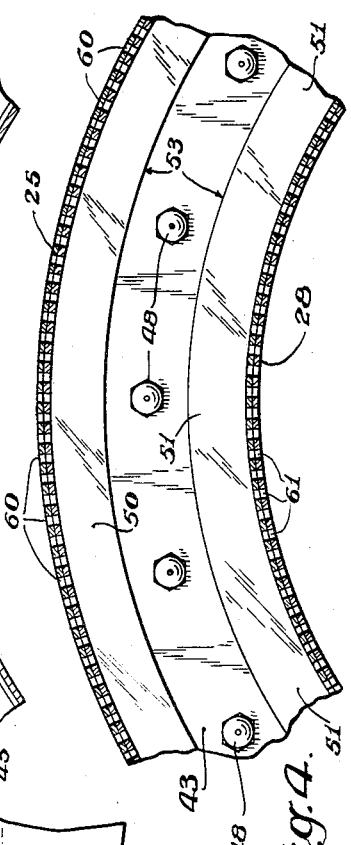
INVENTOR
Robert A. Sforzini
BY
[signature]
ATTORNEY Patented Mar. 20, 1951

2,545,495

UNITED STATES PATENT OFFICE 2,545,495

ANNULAR COMBUSTION CHAMBER AIR FLOW ARRANGEMENT ABOUT THE FUEL NOZZLE END

Robert A. Sforzini, Toledo, Ohio, assignor to Westinghouse Electric Corporation, East Pittsburgh, Pa., a corporation of Pennsylvania Application August 6, 1947, Serial No. 766,715

6 Claims. (Cl. 60—44)

1

This invention relates to gas turbine power plants and has for an object the provision of improved combustion apparatus for a gas turbine engine.

After continued operation of a gas turbine engine of the well-known type comprising a combustion chamber interposed between an air compressor, and a gas turbine operable by heated fluid under pressure to drive the compressor, undesired accumulation of solid products of fuel combustion, or coking, on and about the fuel nozzles may begin to impede the proper atomization and distribution of fuel necessary for promotion of uniform combustion. Heavy deposits of coke one-half inch or more in thickness in the apical region of the combustion chamber are undesirable for the further reason that pieces of coke might become dislodged and travel into the turbine, causing damage to the blading. It is thus desirable to provide a fuel combustion structure that will prevent or at least reduce the coking tendency during regular service operation of the engine.

It is, accordingly, another object of this invention to provide an improved combustion apparatus for a gas turbine power plant including a combustion chamber having fuel nozzles located in an apical portion thereof, and means for directing axial streams of air under pressure through the apical region and over the nozzles and adjacent surfaces, thereby creating local turbulence effectively minimizing deposition of coke.

Still another object is the provision of an improved combustion chamber structure for a gas turbine including means for establishing a localizing cooling blanket of circulating air under pressure in the fuel injection region for preventing accumulation of coke deposits.

Other objects and advantages of the invention will appear in the following more detailed description thereof, taken in connection with the accompanying drawing, in which:

Figure 1 is a schematic elevational view, partly in section, of a gas turbine power plant embodying an improved combustion apparatus constructed in accordance with the invention;

Figure 2 is a fragmentary elevational view in enlarged sectional detail of the combustion apparatus forming part of the power plant shown in Figure 1; and Figures 3 and 4 are fragmentary sectional views taken substantially along the lines III—III and IV—IV of Fig. 2, respectively.

Referring to Figure 1 of the drawing, an illustrative gas turbine power plant of the type with which my invention may be associated may comprise an outer casing structure 10 in which is supported an inner casing structure 11, forming an annular passageway 12 which extends longitudinally of the plant from a forward intake opening 13 to a rearwardly-disposed discharge nozzle 14. The power plant is adapted to be mounted in or on the fuselage or wing of an aircraft, with the intake opening 13 pointed in the direction of flight. Mounted within the casing 10 along the longitudinal axis thereof are a fairing member or core section 16 which may house auxiliary control apparatus (not shown), an axial-flow compressor 17, combustion apparatus 18 including a generally annular fuel combustor or basket structure 19, and a two-stage turbine 20, the rotor of which is operatively connected to the rotor of compressor 17 by means of a common shaft 21. The shaft 21 may be journaled in suitable bearings 22 carried by the inner casing structure 11. Rearwardly of the turbine 20 is mounted a centrally-disposed tailpiece 23, which may be arranged for adjustment to vary the flow area of the discharge nozzle 14.

In operation, air entering the intake opening 13 is supplied to the compressor 17 which delivers the air under pressure to the combustion apparatus 18, in which fuel is burned at temperatures ranging between 900° and 3000° F. From the combustion apparatus 18 the heated motive fluid under pressure is expanded in the turbine 20 and is then discharged through the nozzle 14, usually in the form of a jet establishing a propulsion force.

The fuel combustor structure 19, in the form illustrated in the drawing, comprises outer cylindrical wall sections 25, 26 and 27, which are successively larger in diameter, and inner cylindrical wall sections 28, 29 and 30, which are successively smaller in diameter. The outer and inner wall sections 25 and 28 are concentrically aligned and arranged in partially telescoping relation with adjacent ends of the similarly arranged sections 26 and 29, the opposite ends of which are in turn partially telescoped within the forward ends of the rearward outer and inner sections 27 and 30. An inner spacer ring 33 having axial openings 34 (see Fig. 2) is interposed between the adjacent surfaces of the adjoining inner wall sections 28 and 29. An outer spacer ring 35 having axial openings 36 is likewise interposed between the telescoped ends of the adjoining sections 25 and 26. As shown in Fig. 1, an apertured spacer ring 38 is in like manner interposed between the adjacent ends of the outer wall sections 26 and 27, while a smaller spacer ring 39 is likewise interposed between the telescoping ends of the inner wall sections 29 and 30. It will thus be seen that the combustor structure 19 is, in effect, provided with walls of stepped or substantially conical cross sections graduated inwardly to the forward or upstream end portion defined between the wall sections 25 and 28, the entire structure enclosing a combustion chamber generally indicated by the reference character 40.

As is best shown in Figure 2 of the drawing, the forward ends of the outer and inner wall sections 25 and 28 terminate in a common plane and are joined by an annular closure member or end section 43, which is provided with lateral flanges 44 and 45 adapted to be welded to the respective wall sections. Associated with the end section 43 is a fairing section 46 enclosing an annular fuel manifold 47, which is adapted to be supplied by fuel under pressure from a suitable source (not shown). The manifold 47 communicates with the combustion chamber 40 through the medium of a plurality of fuel injection nozzles 48, which are circumferentially spaced and are mounted in the end section 43 concentrically of the combustion chamber 40. It will be understood that in operation, fuel is supplied under pressure through the manifold 47 and is injected through the usual restricted ports in the several nozzles 48 into the combustion chamber 40, where the atomized fuel is ignited and burned, the combustion process being supported by air under pressure admitted from the passageway 12 to the combustion chamber by way of the apertures including the apertures 34 and 36.

According to the invention, shielding means is provided within the upstream end portion of the combustion chamber 40 in association with the nozzles 48 for directing auxiliary jets of air under pressure over the nozzles and adjacent surfaces for preventing accumulation of the undesired deposits of coke already mentioned. This shielding means may comprise an outer annular flange or baffle wall member 50 supported by the outer wall section 25 closely adjacent the end section 43, and an annular flange or baffle wall member 51 aligned with the flange member 50 and supported on the inner wall section 28. The respective flange members 50 and 51 are adapted to form an annular space 52 communicating with combustion chamber 40, the flange members being spaced apart to provide an annular fuel admission opening 53 through which atomized fuel can be expelled from the nozzles 48 into the combustion chamber 40, as shown in Figure 2.

Formed in the end section 43 on opposite sides of the nozzles 48 are staggered rows of arcuate slots 55, which are arranged to direct jets or streams of air under pressure from the passageway 12 through the space 52 and past the projecting flange members 50 and 51 into combustion chamber 40. The flange members are adapted to deflect these streams of air under pressure toward the respective nozzles 48, which are thereby blanketed by currents of air circulating in the region wherein coking might otherwise tend to develop. It will thus be seen that the flange members 50 constitute baffles defining the space 52 which is continually swept clean by air under pressure admitted through the slots 55, the air under pressure being thence directed past the nozzles and through the annular opening 53 into the combustion chamber 40, where the combustion process is maintained. It will, furthermore, be apparent that in addition to the main function of the auxiliary streams of air under pressure admitted through the ports 55 in minimizing formation of coke, the resultant turbulence in the region of the nozzles 48 will have a desirable cooling effect.

Auxiliary apertures 60 and 61 are formed in the outer and inner wall sections 25 and 28, respectively, and in the adjacent flanges of the respective flange members or baffles 50 and 51, for directing laterally flowing streams of air under pressure across the downstream surfaces of the flange members, in order to prevent formation of coke deposits on these surfaces, as well as to augment the sweeping action of the air under pressure issuing through the annular opening 53. The flange members 50 and 51 are at the same time adapted to constitute anchoring surfaces for facilitating maintenance of uniform and constant flame characteristics within the combustion chamber 40.

From the foregoing it will now be apparent that an improved fuel combustion apparatus constructed in accordance with my invention may readily be installed in a gas turbine of existing design for minimizing the undesired development of coke deposits, without in any way reducing the efficiency of the engine during service operation.

While the invention has been shown in but one form, it will be obvious to those skilled in the art that it is not so limited, but is susceptible of various changes and modifications without departing from the spirit thereof.

What is claimed is:

1. Combustion apparatus for a gas turbine engine having inner and outer casing sections defining an annular inlet passage for fluid under pressure flowing at high velocity, an annular combustor structure supported therein comprising telescoped inner and outer walls graduated inwardly at the upstream end, joined by an annular flat end section to provide an annular combustion chamber, said end section being disposed normal to the path of fluid flowing through said passage, a plurality of circumferentially spaced fuel atomizing nozzles mounted in said end section for injecting fuel into the upstream end of said combustion chamber, radially spaced annular baffles mounted on said inner and outer walls adjacent and parallel to said end section, and a plurality of apertures formed in said end section for directing streams of fluid under pressure from said inlet flow passage against said baffles and said nozzles for minimizing accumulation thereon of fuel deposits.

2. Combustion apparatus for a gas turbine engine having inner and outer casing sections defining an annular inlet passage for fluid under pressure flowing at high velocity, an annular combustor structure supported therein comprising telescoped inner and outer walls graduated inwardly at the upstream end, joined by an annular flat end section to provide an annular combustion chamber, said end section being disposed normal to the path of fluid flowing through said passage, a plurality of circumferentially spaced fuel atomizing nozzles mounted on said end section for injecting fuel into the upstream end of said combustion chamber, said inner and outer walls having a plurality of spaced apertures formed therein downstream of said end section and adapted to supply fluid under pressure from said inlet flow passage into said combustion chamber for supporting combustion of fuel therein, radially spaced shield members carried by said inner and outer walls intermediate said apertures therein and said end section, said shield members being disposed in spaced relation adjacent said nozzles and parallel to said end section, said end section having a plurality of ports formed therein to direct fluid under pressure from said passage against said shield members in streams blanketing said nozzles for minimizing local accumulation of coke during the combustion of fuel in said combustion chamber.

3. Combustion apparatus for a gas turbine engine having inner and outer casing sections defining an annular inlet passage for fluid under pressure flowing at high velocity, an annular combustor structure supported therein comprising inner and outer walls closed at the upstream end by an annular end section to provide an annular combustion chamber, a plurality of circumferentially spaced fuel atomizing nozzles mounted in said end section for injecting fuel into the upstream end of said combustion chamber, said end section having concentric rows of auxiliary ports formed inwardly and outwardly of said nozzles and adapted to admit axially flowing streams of fluid under pressure from said passage to said combustion chamber adjacent said nozzles, and baffle means mounted parallel to said end section in spaced relation with respect to said nozzles, said baffle means being adapted to deflect fluid under pressure flowing from said ports for creating local turbulence in the region of said nozzles preventing deposit of fuel solids during combustion within said combustion chamber.

4. Combustion apparatus for a gas turbine engine having inner and outer casing sections defining an annular inlet passage for fluid under pressure flowing at high velocity, an annular combustor structure supported therein comprising telescoped inner and outer walls graduated inwardly at the upstream end, joined by an annular flat end section to provide an annular combustion chamber, said end section being disposed normal to the path of fluid flowing through said passage, a plurality of circumferentially spaced fuel atomizing nozzles mounted in said end section for injecting fuel into the upstream end of said combustion chamber, said flat wall of the end section having a plurality of auxiliary ports adapted to admit axially flowing streams of fluid under pressure from said passage to said combustion chamber adjacent said nozzles, and baffle means mounted near and parallel to said end section in shielding relation with said nozzles, said baffle means being adapted to deflect fluid under pressure flowing from said ports in blanketing streams about said nozzles preventing deposit of fuel solids during combustion within said combustion chamber, said inner and outer walls having a plurality of auxiliary ports formed adjacent the downstream sides of said baffle means for causing radially flowing streams of fluid under pressure issuing from said passage to sweep the adjacent surfaces of said baffle means.

5. Combustion apparatus for a gas turbine engine having inner and outer casing sections defining an annular inlet passage for fluid under pressure flowing at high velocity, an annular combustor structure supported therein comprising telescoped inner and outer walls graduated inwardly at the upstream end, joined by an annular flat end section to provide an annular combustion chamber, said end section being disposed normal to the path of fluid flowing through said passage, a plurality of circumferentially spaced fuel atomizing nozzles mounted in said end section for injecting fuel into the upstream end of said combustion chamber, an annular baffle supported on said outer wall within said combustion chamber, and an annular baffle supported on said inner wall in spaced alignment with said first-named baffle, said baffles being mounted parallel to said end section in closely straddling relation with respect to said nozzles, said end section having a plurality of staggered arcuate slots through which fluid under pressure is directed from said inlet passage to be deflected by said baffles in streams blanketing said nozzles for minimizing local deposit of solid products of combustion.

6. Combustion apparatus for a gas turbine power plant having casing structure defining an annular passage for air under pressure flowing at high velocity, an annular sheet metal structure supported therein, comprising apertured inner and outer annular walls closed at the upstream end by an annular end section to form a combustion chamber having a main zone of combustion intermediate the ends thereof, said end section providing a flat annular wall disposed substantially normal to the axis of said annular passage and having formed therein a plurality of nozzle openings interposed between concentric rows of auxiliary air ports, a pair of concentric annular flanges extending radially into said chamber from said inner and outer walls adjacent said end section, said flanges forming a nozzle chamber upstream of said combustion zone and communicating through an annular opening with said combustion chamber, said inner and outer walls having closely spaced lateral ports adjacent said flanges for admitting air to scour the downstream surfaces thereof, and a plurality of fuel nozzles mounted in said nozzle openings of said end section in alignment with said annular opening between said flanges, said nozzles being subjected to a blanket of air flowing into said nozzle chamber at high velocity through said auxiliary ports and impinging on said flanges for minimizing local deposition of coke.

ROBERT A. SFORZINI.

REFERENCES CITED

The following references are of record in the file of this patent:

UNITED STATES PATENTS

| Number | Name | Date |
| --- | --- | --- |
| 1,129,791 | Coen | Feb. 23, 1915 |
| 2,219,696 | Mueller et al. | Oct. 29, 1940 |
| 2,411,181 | Althorfer | Nov. 19, 1946 |
| 2,422,214 | Meyer et al. | June 17, 1947 |